Feb. 13, 1968  YASUNOSUKE TORII  3,369,162

CONTROL SYSTEM FOR DRIVING MOTORS OF ELECTRIC CARS

Filed Jan. 14, 1965                                         2 Sheets-Sheet 1

United States Patent Office 3,369,162
Patented Feb. 13, 1968

3,369,162
CONTROL SYSTEM FOR DRIVING MOTORS OF ELECTRIC CARS
Yasunosuke Torii, Musashino-shi, Tokyo, Japan, assignor to Tokyo Shibaura Electric Co., Ltd., Kawasaki-shi, Japan, a corporation of Japan
Filed Jan. 14, 1965, Ser. No. 425,521
Claims priority, application Japan, Jan. 17, 1964, 39/1,949
1 Claim. (Cl. 318—111)

ABSTRACT OF THE DISCLOSURE

A system for controlling motor current of an electric car wherein current regulators can be connected in series with corresponding motors at the time of transition of said motors from series to parallel connections.

This invention relates to a control system for electric cars and more particularly to an improved current regulator for electric cars utilizing controlled rectifier elements such as silicon controlled rectifier elements.

In order to effect smoothly powering, dynamic braking and the like control operations of electric cars which are driven by direct current motors it is usual to insert a multi-stage resistor in the main circuit of the driving motors which are sequentially short circuited by a plurality of contactors. Where the feature of weak field control is incorporated a number of weak field contactors are added which are sequentially closed to gradually decrease the excitation of series field of the driving motors subsequent to the completion of short circuiting of all sections of the starting resistor during powering operation. However such mechanical contactors are disadvantageous because their contacts are damaged by electric arcs, their weight and volume are large, and they require constant maintenance and repair.

In order to eliminate these defects it has been proposed to use controlled rectifier elements instead of mechanical contactors. However, mere substitution of controlled rectifier elements does not solve perfectly all of the disadvantages mentioned above. More particularly, in electric cars wherein the connection of a plurality of high capacity driving motors is changed from series to parallel, the number of controlled rectifier elements required becomes excessive because the voltage and current capacities of currently available semiconductor controlled rectifier elements are not sufficiently high. At the time of starting the motors, the full line voltage is applied across the controlled rectifier elements, so that it is necessary to connect in series that number of controlled rectifier elements that can withstand the line voltage. After the driving motors start to rotate, the voltage supplied across the controlled rectifier elements is decreased owing to the magnitude of the counter electromotive force, so that a smaller number of controlled rectifier elements are required. A number of controlled rectifier elements not necessary during operations of electric cars are employed merely for starting the motors, which is wasteful in lowering the utilization factor. The words "utilization factor" are intended to mean the number of the controlled rectifier elements required for effecting current regulation of one motor, i.e. the factor is defined and expressed by (total number of the controlled rectifier elements)/(the number of motors).

It is therefore an object of this invention to provide a novel control system for driving motors of electric cars by which the number of controlled rectifier elements required to control motor current can be greatly decreased.

A further object of this invention is to provide a novel control system utilizing a plurality of controlled rectifier elements which are operated at a high utilization factor.

A still further object of this invention is to provide a novel current regulator which can smoothly accelerate the car without any accompanying power loss as in the conventional starting or accelerating resistors utilized in electric cars.

A further object of this invention is to provide a novel control system for electric cars wherein controlled rectifier elements are relieved from dangerous ground current hazard which may occur in driving motors of the car.

Briefly stated, the control system according to this invention comprises a plurality of driving motors, means to change the connection of said motors from a series connection to parallel connections, a plurality of current regulators of the same number as the number of parallel motor circuits, each of said current regulators including a plurality of controlled rectifier elements, means to connect said current regulators in series with each other and in series with said motors when they are connected in said series connection and means to connect each one of said current regulators in series with each one of said parallel connections when said motors are connected in said parallel connections.

Each of the current regulators preferably comprises a main semiconductor controlled rectifier element adapted to be connected in series with the motor circuit, an auxiliary semiconductor controlled rectifier element of the same polarity as said main controlled rectifier element and connected in parallel therewith via a commutating condenser, a half wave rectifier of the opposite polarity as said main and auxiliary controlled rectifier elements, a reactor designed to form a resonance circuit in cooperation with said commutating condenser and means to connect said half wave rectifier in series with reactor across said auxiliary controlled rectifier elements.

For a complete understanding of the invention, reference may be had to the accompanying drawings, in which.

Figure 2:
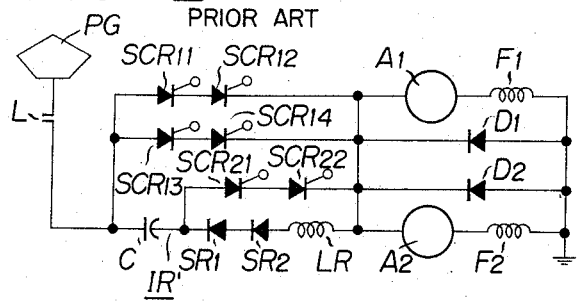
FIG. 2 is a schematic diagram of a conventional motor control device utilizing the current regulator shown in FIG. 1.
Figure 3:
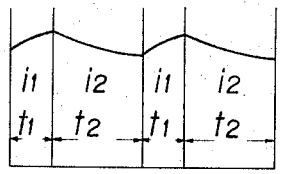
Figure 3:
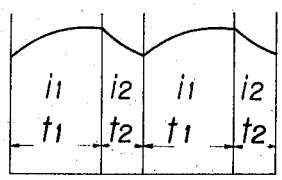
Figure 3:
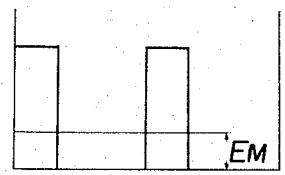
Figure 3:
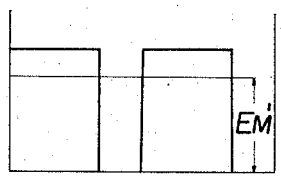
Figure 4:
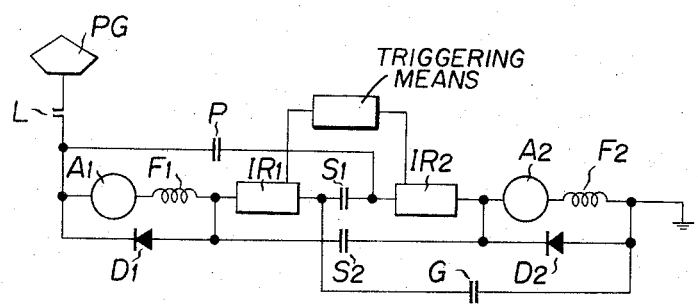
Figure 5:
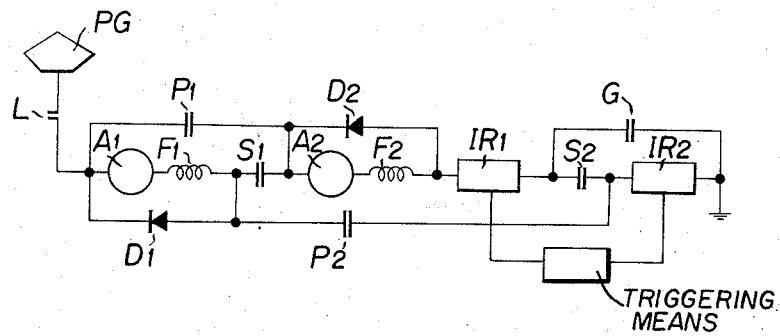

FIGS. 3A to 3D inclusive are graphs to illustrate the relation among time, current and voltage for the purpose of explaining the operation of the control device shown in FIG. 2;

FIG. 4 shows a schematic diagram illustrating one embodiment of this invention; and FIG. 5 shows a schematic diagram of a modification of this invention.

Figure 1:
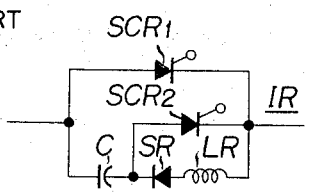
FIG. 1 shows a connection diagram of one example of a current regulator including semiconductor controlled rectifier elements utilized in this invention.

Referring now to the accompanying drawing, FIG. 1 shows a recently developed current regulator comprising a main controlled rectifier element $SCR_1$ adapted to be connected in series with one or more driving motors of an electric car, an auxiliary controlled rectifier element $SCR_2$ connected across the main controlled rectifier element via a commutating condenser C, a half wave rectifier SR and a resonance reactor LR which are connected in series across the auxiliary controlled rectifier element. If it is assumed that a control pulse is applied to a gate electrode of the auxiliary controlled rectifier element from a suitable control device not shown in the drawing, the auxiliary controlled rectifier element $SCR_2$ will be rendered conductive to charge the commutating condenser C to a voltage substantially equal to the voltage across the anode and cathode electrodes of the main controlled rectifier element $SCR_1$. After a predetermined time interval when the main controlled rectifier element $SCR_1$ is rendered conductive by a control pulse supplied to its gate electrode, the charge of the condenser C will be discharged through the main and auxiliary controlled rectifier elements to turn off the latter by applying a reverse voltage thereacross. Thereafter the discharge current of the commutating condenser C will flow through the reactor LR and the rectifier SR. As is well known in the art the current through the reactor will reach its maximum value when the voltage across the condenser is decreased to zero and thence the condenser will be charged to the opposite polarity by the oscillatory action of the condenser C and the reactor LR. After a predetermined time interval when the auxiliary rectifier element $SCR_2$ is again rendered conductive, the charge of the condenser will be discharged through the main and auxiliary controlled rectifier elements in the opposite direction to turn off the main controlled rectifier element. This cycle of operation is repeated to alternately render conductive the main and auxiliary controlled rectifier elements, so as to control the conduction period of the main controlled rectifier element. In other words, the mean value of current flowing through the driving motor or the speed of the electric car can be controlled by the current regulator shown in FIG. 1 without any power loss or IR drop consumed by the starting resistor.

FIG. 2 illustrates one example of a conventional construction of a control system for current flowing through driving motors of an electric car. In this figure, two parallel connected DC series motors comprising armatures $A_1$, $F_1$ and $A_2$, $F_2$, respectively, are connected between a pantograph PG and the ground through a line breaker L and a current regulator generally designated by IR′. While the current regulator IR′ is generally the same as the current regulator IR shown in FIG. 1, as the voltage and current ratings of the driving motors are considerably higher than those of semiconductor controlled rectifier elements presently available in the market, four main controlled rectifier elements $SCR_{11}$ to $SCR_{14}$ inclusive, two auxiliary controlled rectifier elements $SCR_{21}$ and $SCR_{22}$ and two half wave rectifiers $SR_1$ and $SR_2$ are employed. Although each two of these rectifier elements are connected in series, it will be clear that when the line voltage is high such as 1500 v., ten elements are to be connected in series and ten series circuits are to be connected in parallel. Thus one hundred main controlled rectifier elements are required. In FIG. 2, $D_1$ and $D_2$ represent discharge rectifiers for driving motors having opposite polarity to that of the main controlled rectifier elements.

The operation of the control system shown in FIG. 2 is as follows. At first the line breaker L is closed and the main controlled rectifier elements $SCR_{11}$ through $SCR_{14}$ are turned on to impress full line voltage to the driving motors. Shortly thereafter the auxiliary controlled rectifier elements $SCR_{21}$ and $SCR_{22}$ are turned on to discharge the commutating condenser C to turn off the main controlled rectifier elements in a manner as described in connection with FIG. 1. During the turn off period of the main controlled rectifier elements the energy stored in the driving motors is discharged through the discharge rectifiers $D_1$ and $D_2$ and the commutating condenser will be charged to the opposite direction. After a predetermined time interval the main controlled rectifier elements $SCR_{11}$ through $SCR_{14}$ are again rendered conductive to reenergize the driving motors to discharge the commutating condenser to turn off the auxiliary controlled rectifier elements $SCR_{21}$ and $SCR_{22}$. Again the condenser will be charged in the opposite direction owing to the resonance reactor L.

FIG. 3A represents a curve to show the on time $t_1$ and the off time $t_2$ of the main controlled rectifier elements wherein $i_1$ shows the current supplied to the driving motors during on time and $i_2$ the discharge current flowing through the discharge rectifiers $D_1$ and $D_2$ during off time $t_2$. As shown in FIG. 3B the line voltage is applied to the driving motors during the on time and hence the average voltage supplied to the driving motors can be represented by $E_M$.

FIGS. 3C and 3D represent current and voltage curves corresponding to FIGS. 3A and 3B, respectively, wherein the on time $i_1$ of the main controlled rectifier elements $SCR_{11}$ through $SCR_{14}$ is elongated. In this case the average voltage supplied to the driving motors from the line is increased to $E'_M$ from $E_M$. By means of a suitable control device, not shown, which is responsive to the motor current, the on time $t_1$ is gradually increased while gradually decreasing the off time $t_2$ to zero. Thus, the current regulator can gradually and smoothly start and accelerate the car without any power loss consumed by the ordinary starting resistor and without using any mechanical contactors to short circuit it.

However as will be clear from the above description the control system shown in FIG. 2 requires to use a great many controlled rectifier elements which are connected in series and parallel to insure successful operation of the control system under relatively high line voltage and relatively large motor current. The reason why a great many controlled rectifier elements connected in series are required is that the full line voltage is supplied across the controlled rectifier elements at the time of starting the driving motors. After the motors are started to rotate, counter electromotive force is caused, so that the number of the controlled rectifier elements may be such as withstanding the difference voltage through subtraction of the counter electromotive force from the line voltage, which reduces the number of controlled rectifier elements. A number of controlled rectifier elements are required for merely starting the motors. Such an arrangement is of course expensive and the utilization factor of the controlled rectifier elements is low.

Accordingly it is a feature of this invention to decrease the number of controlled rectifier elements required and also to improve their utilization factor.

FIG. 4 represents a schematic drawing of one embodiment of this invention wherein a pair of current regulators $IR_1$ and $IR_2$, each similar to that shown in FIG. 1, are connected in series by means of a contactor $S_1$ and these current regulators are connected between the line and the ground via a line contactor L, a first driving motor including an armature $A_1$ and a series field winding $F_1$, the contactor $S_1$ and a second driving motor including an armature $A_2$ and a series field winding $F_2$. A contactor $S_2$ is connected across serially connected current regulators $IR_1$ and $IR_2$, and contactors P and G are provided to connect in parallel two series branches each comprising one driving motor and one current regulator. Again discharge rectifiers $D_1$ and $D_2$ are connected in parallel with the respective driving motors.

To start the electric car the line breaker L and the contactor $S_1$ are closed to connect in series all of the driving motors and current regulators across the source. The on time of the first and second current regulators $IR_1$ and $IR_2$ is gradually increased to start and accelerate the car just in the same manner as has been described in connection with FIG. 3. When the current regulators are controlled to pass motor current continuously, the contactor $S_2$ is closed to short circuit the current regulators, at which time the control for these current regulators is returned to the original state, or off condition. Then the contactor $S_1$ is opened and then the contactors P and G are closed to connect in parallel two driving motors. After the first and second current regulators have been adjusted to a proper on time, the contactor $S_2$ is opened and then the on time of the parallel connected current regulators is gradually increased to accelerate the car to its highest speed. It should be particularly noted that while the full line voltage is impressed across the respective series branches when they are connected in parallel, the voltage across the respective current regulators is about one half of that of the connection of FIG. 2, because at the time of transition from series to parallel the counter electromotive forces of driving motors have usually increased to about one half of the full line voltage. Thus the number of main controlled rectifier elements required to be connected in series is the same as that of FIG. 2. Moreover by the arrangement shown in FIG. 4 the number of parallel branches of the main controlled rectifier elements to be included in each current regulator can be decreased to one half of that required in the arrangement of FIG. 2. Thus, the whole number of the main controlled rectifier elements can be reduced to one half. Accordingly the capacity of the commutating condenser and the number of auxiliary controlled rectifier elements can also be reduced to one half when compared to the arrangement shown in FIG. 2, thus greatly reducing the cost, space and weight of the control system.

FIG. 5 shows a modified embodiment of this invention wherein the same reference characters designate the same components as in FIG. 4. In this embodiment the first and second driving motors are connected in series via a contactor $S_1$, the first and the second current regulators $IR_1$ and $IR_2$ are also connected in series via a contactor $S_2$ and these two series combinations are connected in series between a pantograph PG and the ground through a line breaker to comprise a series starting circuit. In order to complete the parallel powering circuit contactors $P_1$, $P_2$ and G are provided to respectively short circuit the first motor and the contactor $S_1$; the contactor $S_1$, the second motor, the first current regular $IR_1$ and the contactor $S_2$; and the contactor $S_2$ and the second current regulator $IR_2$.

In operation, at the time of starting, the line breaker L and the contactors $S_1$ and $S_2$ are closed to complete the above mentioned series circuit and then the on time of both current regulators $IR_1$ and $IR_2$ is gradually increased until these regulators become conductive continuously. Then the contactor G is closed to short circuit the second current regulator $IR_2$, contactors $P_1$ and $P_2$ are closed and the contactors $S_1$ and $S_2$ are opened, thus completing two parallel circuits each including one driving motor and one current regulator. In order to provide smooth transition between the series running and the parallel running the on time of current regulators is gradually increased from such a value that the sum of motor currents flowing through two parallel circuits is equal or slightly larger than the current that has flowed through the series circuit just before transition. While a slight variation in tractive force is unavoidable at the time of transition from series to parallel connection, as the current regulators utilizing semiconductor rectifiers are situated on the ground side with respect to their associated driving motors, flash over current of the motors will flow through the grounded machine frames and not through the semiconductor rectifier elements, thus relieving them from the danger of excessive current.

While in the foregoing embodiments two driving motors which are connected in series and parallel have been shown, when six driving motors are used which are changed their connections from six motors in series, to two parallel circuits each including three motors in series and thence to three parallel circuits each including two motors in series, the number of controlled rectifier elements in current regulators can be reduced to one third according to this invention when compared to the conventional connection as illustrated in FIG. 2. Similarly in the case where eight driving motors are utilized, the number of controlled rectifier elements can be reduced to one fourth.

In summary, in accordance with this invention there are provided a plurality of current regulators utilizing controlled rectifier elements, of the same number as the number of parallel motor circuits which are to be established at the final stage of powering operation of an electric car, and said current regulators are connected in series with each other and with driving motors when the latter are connected in series whereas said current regulators are connected in series with respective one of parallel connected motor circuits so that it is able to greatly decrease the number of controlled rectifier elements utilized in the current regulators and to improve the utilization factor thereof.

While the invention has thus been described and several embodiments shown, the invention is obviously not limited to these shown embodiments, but instead many modifications will occur to those skilled in the art which will lie within the spirit and scope of the invention. For example, the trolley wire may be fed with a suitable high voltage A.C. current and a rectifying device such as a mercury arc rectifier may be installed in electric cars, especially electric locomotives. Furthermore, although, nothing has been said with regard to the control device for current regulators it should be understood that they are controlled by the principle of well known current limiting relays. More particularly, there is provided a suitable static pulse generator to generate pulses which are to be supplied to the gate electrodes of the main and auxiliary controlled rectifier elements included in the respective current regulators and means responsive to motor current is provided to control the relative phase relationship between said pulses, or the relative length of said on and off times (FIG. 3) so as to gradually accelerate the car without exceeding the maximum permissible motor current. It is thus intended that the invention be limited in scope only by the appended claim.

What is claimed is:
1. A control system for driving motors of an electric car comprising a plurality of driving motors, means to provide a series circuit of said motors to connect said series circuit across an electrical power source, means to provide parallel circuits of said motors to connect said parallel circuits across the electrical power source, said parallel circuits each including at least one of said motors connected in series, and a plurality of current regulators the number of current regulators corresponding to the number of said parallel motor circuits, said current regulators being connected in series with each other and in series with said motors when they are connected in said series motor circuit and being connected in series with respectively corresponding motors when they are connected in said parallel motor circuits, said current regulators each including a main controlled rectifier element for permitting the flow of main current from a power source to said motors, an auxiliary controlled rectifier element for rendering non-conductive said main controlled rectifier element and a commutating element storing electrical energy while said main controlled rectifier element is rendered conductive, applying the stored energy upon said main controlled rectifier element in the reverse direction when said auxiliary controlled rectifier element has been rendered conductive to render non-conductive said main controlled rectifier element, so as to control the conduction period of the main controlled rectifier element.

References Cited
UNITED STATES PATENTS 3,223,909   12/1965   Sensing et al. _____ 318—341 X

FOREIGN PATENTS 1,094,349   12/1960   Germany.

ORIS L. RADER, Primary Examiner.

B. A. COOPER, Assistant Examiner.